United States Patent
Chang et al.

(10) Patent No.: US 8,629,705 B2
(45) Date of Patent: Jan. 14, 2014

(54) LOW VOLTAGE SIGNALING

(75) Inventors: Leland Chang, New York, NY (US); Robert H. Dennard, Croton-on-Hudson, NY (US); Brian L. Ji, Fishkill, NY (US); Wing K. Luk, Chappaqua, NY (US); Robert K. Montoye, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 852 days.

(21) Appl. No.: 12/794,995

(22) Filed: Jun. 7, 2010

(65) Prior Publication Data

US 2011/0298440 A1 Dec. 8, 2011

(51) Int. Cl.
*H03L 5/00* (2006.01)
(52) U.S. Cl.
USPC .......................................... 327/333
(58) Field of Classification Search
None
See application file for complete search history.

(56) References Cited

U.S. PATENT DOCUMENTS

| | | | |
|---|---|---|---|
| 4,752,699 A | 6/1988 | Cranford, Jr. et al. | |
| 5,270,581 A | 12/1993 | Nakamura | |
| 5,581,506 A | 12/1996 | Yamauchi | |
| 5,631,816 A | 5/1997 | Brakus | |
| 5,867,040 A | 2/1999 | Fuse et al. | |
| 5,897,040 A | 4/1999 | Ward | |
| 6,075,401 A | 6/2000 | Inoue et al. | |
| 6,147,540 A * | 11/2000 | Coddington | 327/333 |
| 6,204,141 B1 | 3/2001 | Lou | |
| 6,304,068 B1 | 10/2001 | Hui et al. | |
| 6,600,220 B2 | 7/2003 | Barber et al. | |
| 6,600,679 B2 | 7/2003 | Tanzawa et al. | |
| 6,617,903 B2 | 9/2003 | Kawamura | |
| 6,646,425 B2 | 11/2003 | Miftakhutdinov | |
| 6,657,420 B1 | 12/2003 | Shacter | |
| 6,744,297 B2 | 6/2004 | Huang | |
| 6,838,927 B2 | 1/2005 | Oonishi | |
| 7,051,306 B2 | 5/2006 | Hoberman et al. | |

(Continued)

FOREIGN PATENT DOCUMENTS

JP 60239117 A 11/1985
WO 2007054858 A2 5/2007

OTHER PUBLICATIONS

U.S. Appl. No. 12/392,476; Non-Final Office Action; Date Filed: Feb. 25, 2009; Date Mailed Oct. 25, 2011.

(Continued)

*Primary Examiner* — Lincoln Donovan
*Assistant Examiner* — Khareem E Almo
(74) *Attorney, Agent, or Firm* — Cantor Colburn LLP; Vazken Alexanian

(57) ABSTRACT

A low voltage signaling system for integrated circuits includes a first voltage domain operating at a nominal integrated circuit (IC) power supply voltage (Vdd) swing level at a signal transmitting end of a first chip, a second voltage domain having one or more transmission interconnect lines operating at a reduced voltage swing level with respect to the first voltage domain, and a third voltage domain at a signal receiving end of a second chip, the third voltage domain operating at the Vdd swing level; wherein an input signal originating from the first voltage domain is down converted to operate at the reduced voltage swing level for transmission over the second voltage domain, and wherein the third voltage domain senses the input signal transmitted over the second voltage domain and generates an output signal operating back up at the Vdd swing level.

21 Claims, 7 Drawing Sheets

(56) References Cited

U.S. PATENT DOCUMENTS

| | | | |
|---|---|---|---|
| 7,095,619 | B2 | 8/2006 | Panella et al. |
| 7,116,594 | B2 | 10/2006 | Luk et al. |
| 7,129,751 | B2 * | 10/2006 | Jahan et al. ............ 326/68 |
| 7,190,210 | B2 | 3/2007 | Azrai et al. |
| 7,230,455 | B2 | 6/2007 | Luk |
| 7,257,723 | B2 | 8/2007 | Galles |
| 7,315,463 | B2 | 1/2008 | Schrom et al. |
| 7,342,389 | B1 | 3/2008 | Wu et al. |
| 7,348,800 | B2 | 3/2008 | Koto et al. |
| 7,358,573 | B2 | 4/2008 | Cecchi et al. |
| 7,518,481 | B2 | 4/2009 | Gardner et al. |
| 7,551,018 | B2 | 6/2009 | Hsu et al. |
| 7,564,263 | B2 | 7/2009 | Walker et al. |
| 7,581,198 | B2 | 8/2009 | Huynh et al. |
| 7,609,114 | B2 | 10/2009 | Hsieh et al. |
| 7,750,717 | B2 | 7/2010 | Ali et al. |
| 7,768,309 | B2 | 8/2010 | Luich |
| 2002/0024374 | A1 | 2/2002 | Ovens et al. |
| 2003/0155897 | A1 | 8/2003 | Miftakhutdinov |
| 2005/0140426 | A1 | 6/2005 | Fujiwara |
| 2005/0145895 | A1 | 7/2005 | Luk |
| 2005/0213267 | A1 | 9/2005 | Azrai et al. |
| 2005/0213280 | A1 | 9/2005 | Azrai et al. |
| 2006/0071650 | A1 | 4/2006 | Narendra et al. |
| 2006/0099734 | A1 | 5/2006 | Narendra et al. |
| 2006/0139086 | A1 | 6/2006 | Heinz et al. |
| 2008/0079461 | A1 | 4/2008 | Lin et al. |
| 2008/0080111 | A1 | 4/2008 | Lin et al. |
| 2008/0080112 | A1 | 4/2008 | Lin et al. |
| 2008/0080113 | A1 | 4/2008 | Lin et al. |
| 2008/0081457 | A1 | 4/2008 | Lin et al. |
| 2008/0081458 | A1 | 4/2008 | Lin et al. |
| 2008/0111242 | A1 | 5/2008 | Lin et al. |
| 2008/0162770 | A1 | 7/2008 | Titiano et al. |
| 2008/0239772 | A1 | 10/2008 | Oraw et al. |
| 2009/0033155 | A1 | 2/2009 | Kanno et al. |
| 2009/0059653 | A1 | 3/2009 | Luk et al. |
| 2009/0103382 | A1 | 4/2009 | Luk et al. |
| 2009/0289291 | A1 | 11/2009 | Cheng et al. |
| 2010/0033224 | A1 | 2/2010 | Acharya |
| 2010/0214014 | A1 | 8/2010 | Dennard et al. |
| 2011/0018919 | A1 * | 1/2011 | Oshima et al. .............. 347/9 |

OTHER PUBLICATIONS

Charge Pumps: An Overview, [online]; [retrieved on Jan. 29, 2009]; retrieved from the Internet http://www.eceg.utoronto.ca/~kphang/ece1371/chargepumps.pdf.

Cockcroft-Walton generator, [online]; [retrieved on Jan. 29, 2009]; retrieved from the Internet http://www.en.wikipedia.org/wiki/Cockcroft-Walton_generator.

D. Maurath et al; "A self-adaptive switched-capacitor voltage converter with dynamic input load control for energy harvesting;" Proc. ESSCIRC; Sep. 14-18, 2009; pp. 284-287.

D. Stepanovic et al.; "Gated-diode Sense Amplifier for Robust Differential sensing in 6T SRAM;" Univ. of California, Berkeley; published on-line; May 3, 2007.

Gerhard Schrom, et al., Feasibility of Monolithic and 3D-Stacked DC-DC Converters for Microprocessors in 90nm Technology Generation, Copyright 2004 ACM, 6 pages.

J. Kwong et al.; "A 65 nm Sub-V Sub-t Microcontroller With Integrated SRAM and Switched Capacitor DC-DC Converter;" IEEE Journal of Solid-State Circuits, vol. 44, Jan. 1, 2009; pp. 115-126.

W. K. Luk et al.; "Gated-Diode Amplifiers;" IEEE Transaction on Circuits and Systems—II: Express Briefs, vol. 52, No. 5; May 2005, pp. 266-270.

International Search Report; International Application No. PCT/US/10/26748; International Filing Date: Mar. 10, 2010; Date of mailing: May 3, 2010; 7 pages.

Written Opinion; International Application No. PCT/US/10/26748; International Filing Date: Mar. 10, 2010; Date of mailing: May 3, 2010; 5 pages.

U.S. Appl. No. 13/552,091; Non-Final Office Action; Filing Date: Jul. 18, 2012; Date of Mailing: Oct. 25, 2012; pp. 1-16.

U.S. Appl. No. 12/623,462; Non-Final Office Action; Date Filed: Nov. 23, 2009; Date Mailed: Feb. 6, 2012; pp. 1-26.

U.S. Appl. No. 12/392,476; Final Office Action; Date Filed: Feb. 25, 2009; Date Mailed: Feb. 9, 2012; pp. 1-9.

U.S. Appl. No. 12/422,391; Final Office Action; Date Filed: Apr. 13, 2009; Date Mailed: Sep. 7, 2011.

International Search Report; International Application No. PCT/EP2010/051288; International Filing Date: Feb. 3, 2010; Date of mailing: Jun. 21, 2010; 5 pages.

F H Khan et al., "A 5 kW Bi-directional Multilevel Modular DC-DC Converter (MMCCC) Featuring Built in Power Management for Fuel Cell and Hybrid Electric Automobiles," Vehicle Power and Propulsion Conference; Sep. 9, 2007, pp. 208-214, IEEE.

Written Opinion of the International Searching Authority; International Application No. PCT/EP2010/051288; International Filing Date: Feb. 3, 2010; Date of mailing: Jun. 21, 2010; 5 pages.

* cited by examiner

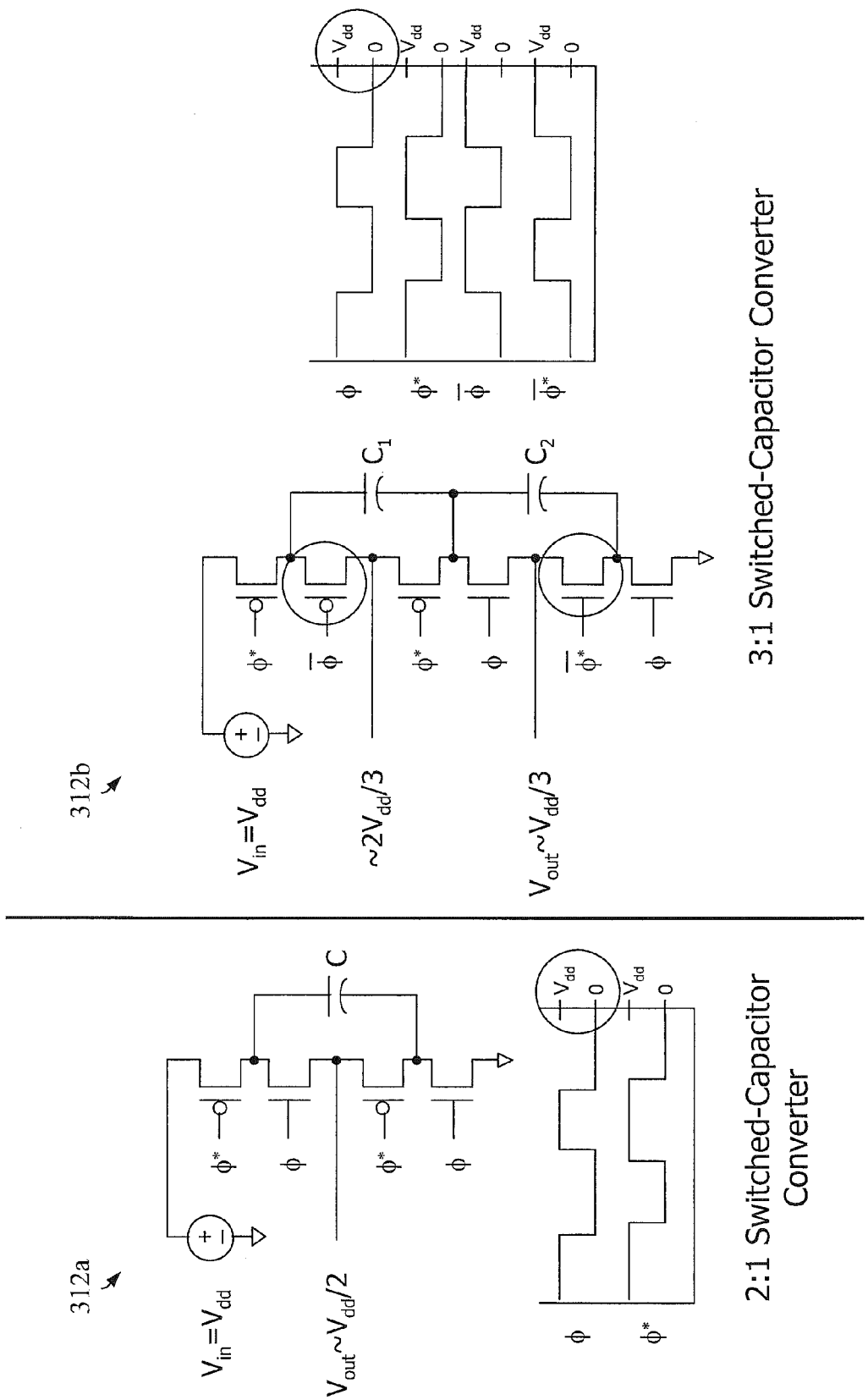

LOW VOLTAGE SIGNALING

BACKGROUND

The present invention relates generally to low voltage interconnect techniques and, more particularly, to low voltage signaling systems and methods for integrated circuit devices.

Power consumption on interconnect lines is a significant contributor to the total power in high performance computing and many other applications. On chip data and clock lines consume significant power over a typical distance. Power consumption of off-chip input/output (I/O) lines such as, for example, those connected to DRAM modules could consume about 30%-70% of the total system power. For the highest speed communications, a high-speed serial link consumes even more power per line.

Current mode circuits are commonly used in both the drivers and receivers for achieving high speed transmission rates (e.g., about 6 gigabytes per second (Gb/s) to 15 Gb/s). Such circuits dissipate even higher power than CMOS drivers due to the constant flowing current. The active power in these off-chip connections is given by the expression:

$$P = CV^2 f$$

where C is the interconnect capacitance, V is the operating voltage, and f is the frequency at which the connection is operated. Most of the energy is thus consumed by charging and discharging the large capacitive load on I/Os.

BRIEF SUMMARY

In an exemplary embodiment, low voltage signaling system for integrated circuits includes a first voltage domain operating at a nominal integrated circuit (IC) power supply voltage (Vdd) swing level at a signal transmitting end of a first chip, a second voltage domain having one or more transmission interconnect lines operating at a reduced voltage swing level with respect to the first voltage domain, and a third voltage domain at a signal receiving end of a second chip, the third voltage domain operating at the Vdd swing level; wherein an input signal originating from the first voltage domain is down converted to operate at the reduced voltage swing level for transmission over the second voltage domain, and wherein the third voltage domain senses the input signal transmitted over the second voltage domain and generates an output signal operating back up at the Vdd swing level.

In another embodiment, method of implementing a low voltage signaling system for integrated circuits includes operating a first voltage domain at a nominal integrated circuit (IC) power supply voltage (Vdd) swing level at a signal transmitting end of a first chip, operating a second voltage domain having one or more transmission interconnect lines at a reduced voltage swing level with respect to the first voltage domain, and operating a third voltage domain at a signal receiving end of a second chip, the third voltage domain operating at the Vdd swing level; and down converting an input signal originating from the first voltage domain to operate at the reduced voltage swing level for transmission over the second voltage domain, and wherein the third voltage domain senses the input signal transmitted over the second voltage domain and generates an output signal operating back up at the Vdd swing level.

In still another embodiment, a low voltage signaling system for integrated circuits includes a first voltage domain operating at a nominal integrated circuit (IC) power supply voltage (Vdd) swing level at a signal transmitting end of a first chip, the first voltage domain including a switched capacitor converter on-chip supply voltage generation unit for generating one or more reduced voltage levels with respect to Vdd, and a level-shifting driver in communication with the on-chip voltage supply generation unit and a first input signal, the level-shifting driver outputting a converted first input signal to a reduced voltage swing level with respect to the first voltage domain; a second voltage domain having one or more transmission interconnect lines operating at the reduced voltage swing level; and a sense amplifier in a third voltage domain at a signal receiving end of a second chip, the third voltage domain operating at the Vdd swing level, wherein the sense amplifier senses the down converted first input signal transmitted over the second voltage domain and generates a first output signal operating back up at the Vdd swing level.

BRIEF DESCRIPTION OF THE SEVERAL VIEWS OF THE DRAWINGS

Referring to the exemplary drawings wherein like elements are numbered alike in the several Figures:

FIGS. 3(a) and 3(b) are schematic diagrams of 2-to-1 and 3-to-1 switched capacitor voltage converters, respectively, in accordance with an exemplary embodiment;

DETAILED DESCRIPTION

Disclosed herein is a low voltage signaling technique for integrated circuit (IC) systems that substantially reduces I/O power. The embodiments herein incorporate a relatively low voltage swing on interconnect lines between a first (e.g., standard) voltage domain at a transmitting end of the IC system and a second (e.g., standard) voltage domain at a receiving end of the system. As described in further detail herein, a voltage down conversion from transmitting end of the system may be implemented through, for example, an on-chip, switched capacitor voltage converter. In addition, a fast, low power sense amplifier may be used at the receiving end of the interconnect line(s) to return the low voltage swing signals to the standard voltage domain.

Figure 1:
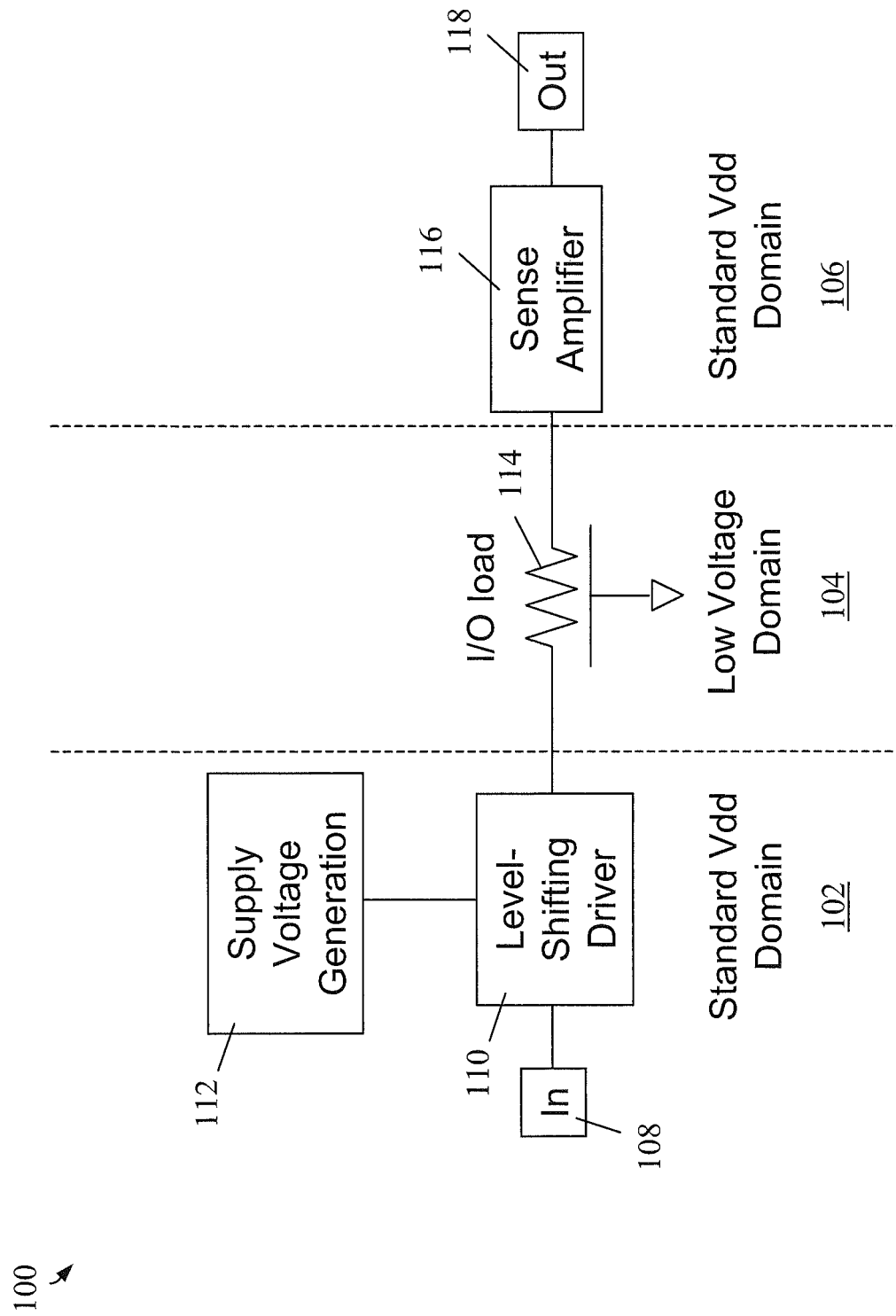
FIG. 1 is a schematic diagram illustrating a low voltage signaling technique for an integrated circuit (IC) system, in accordance with an exemplary embodiment.

Referring initially to FIG. 1, there is shown a schematic diagram illustrating a low voltage signaling technique for an integrated circuit (IC) system 100, in accordance with an embodiment of the invention. As is shown, the system 100 includes a first voltage domain 102 operating at a "standard" or nominal IC power supply voltage (Vdd) swing level at a transmitting end, a second voltage domain 104 for one or more transmission lines operating at a reduced voltage swing level with respect to the full Vdd swing, and a third voltage domain 106 that also operates at the Vdd level at a receiving end. In one exemplary embodiment, the first voltage domain 102 may represent a processing module of one chip, the third voltage domain 106 may represent a memory module (e.g., DRAM) of another chip, and the second voltage domain 104 may represent transmission interconnect lines between the chips.

As indicated above, the power consumption of off-chip I/O lines such as may consume about 30%-70% of the total system power. Thus, the second voltage domain 104 is designed to operate at a lower voltage swing with respect to the on-chip first and third voltage domains 102, 106. In one non-limiting example, the voltage swing of the second voltage domain may be about 0.25 volts (V), as compared to a "full Vdd" voltage swing of about 0.925 V in the first and third voltage domains 102, 106. Other voltage domain values are also contemplated however.

In the first voltage domain 102, an input signal 108 has its operating voltage range down-converted through the use of a level-shifting driver 110 in communication with an on-chip supply voltage generation unit 112. As described in further detail below, the supply voltage generation unit 112 may be implemented through a switched capacitor converter, such as a 2:1 or a 3:1 converter for example. The level-shifting driver 110 receives inputs swinging from, for example, 0 V to the full Vdd value, and in turn outputs a reduced voltage signal that is transmitted over the I/O lines of the second voltage domain 104, represented as an interconnect I/O load 114. As the power dissipated by the I/O load 114 is proportional to the square of the operating voltage, a reduction in transmission line signal voltage of about 2 or 3 times results in a significant power savings.

In the third voltage domain 106, the low voltage signal carried over the I/O load 114 is then up-converted through a sense amplifier 116, which generates an output signal 118 operating back up in the 0 V to full Vdd range. As described in further detail below, the sense amplifier 116 may be implemented through a gated diode configuration, for example.

Figures 2A, 2B:
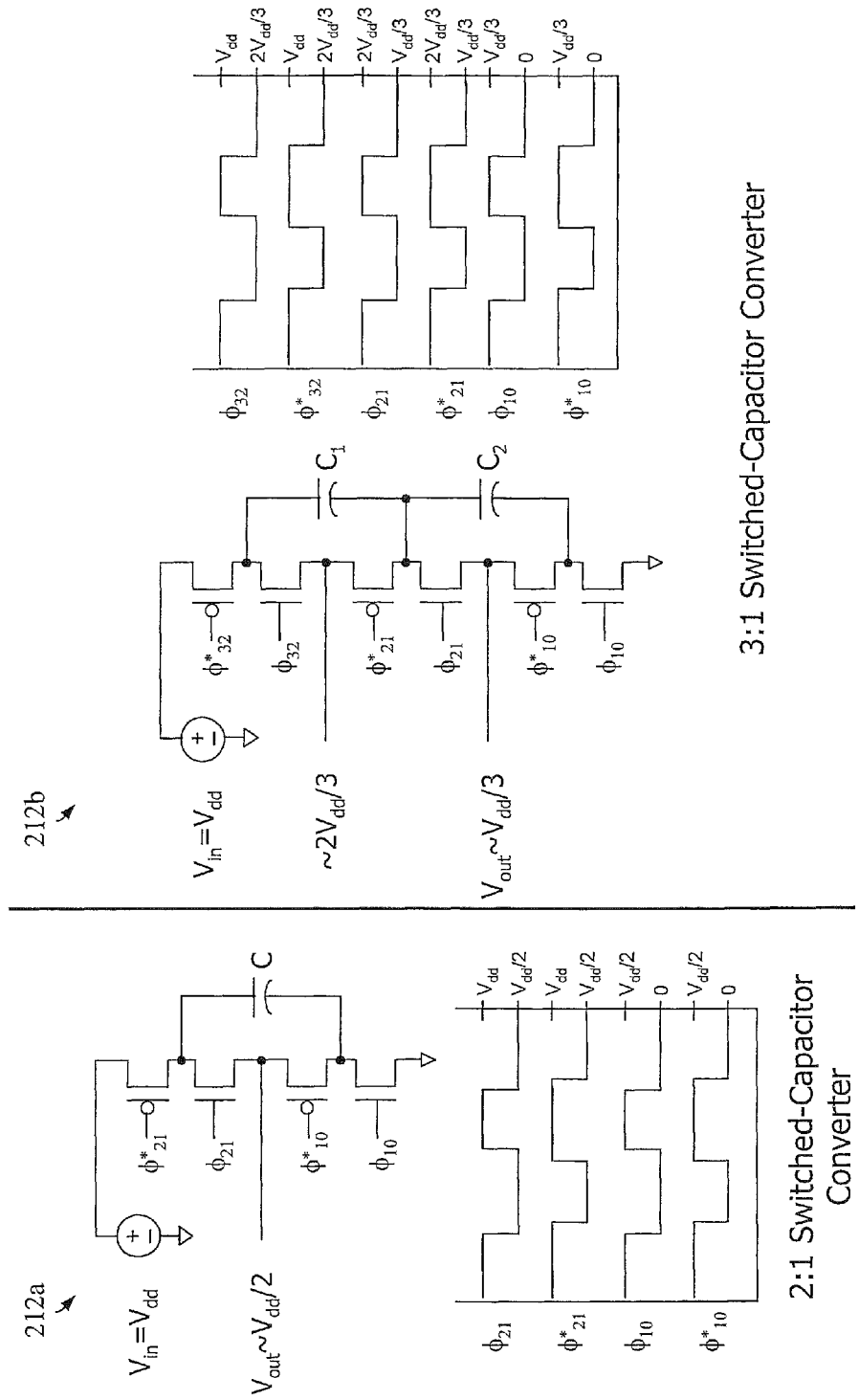
FIGS. 2(a) and 2(b) are schematic diagrams of exemplary 2-to-1 and 3-to-1 switched capacitor voltage converters, respectively.

Referring now to FIG. 2(a), there is shown a schematic diagram of an exemplary 2-to-1 switched capacitor voltage converter 212a and associated timing diagram, wherein the switches are implemented using SOI CMOS technology, for example. More specifically, the 2-to-1 voltage converter 212a of FIG. 2(a) uses a pair of PFETs and a pair of NFETs. The upper PFET selectively couples a first capacitor electrode to the Vdd rail, while the lower PFET selectively couples the second capacitor electrode to the $V_{out}$ rail. The lower NFET selectively couples the first capacitor electrode to the ground rail while the upper NFET selectively couples the second capacitor electrode to the Vdd rail. In a down-conversion mode, Vdd is the input voltage and $V_{out}$ is the output voltage, where $V_{out} \sim Vdd/2$.

The actuating (clock) signals applied to the gates of the upper PFET and upper NFET ($\phi^*_{21}$ and $\phi_{2-1}$) swing between Vdd and Vdd/2. Conversely, the actuating signals applied to the gates of the lower PFET and lower NFET ($\phi^*_{10}$ and $\phi_{10}$) swing between Vdd/2 and ground (0 V). In this example, non-overlap clocks are used to avoid a transient condition of creating a direct path from Vdd to GND (i.e., preventing all four FETs from being simultaneously conductive). An advantageous aspect of this embodiment is that each transistor switch is only subjected to relatively small voltage swings. For example, the gate terminals of upper PFET and NFET in FIG. 2 are within the voltage domain between Vdd and Vdd/2, while the gate terminals of PFET and NFET are within the voltage domain between Vdd/2 and ground.

FIG. 2(b), is a schematic diagram of an exemplary 3-to-1 switched capacitor voltage converter 212b and associated timing diagram. Here, the converter 212b includes three PFETs and three NFETs and provides an intermediate voltage node 2Vdd/3 between Vdd and Vdd/3. Similar to the 2-to-1 converter of FIG. 2(a), the gate terminals of the lower NFET and PFET operate in a voltage domain between ground and Vdd/3; the gate terminals of the middle NFET and PFET operate in a voltage domain between Vdd/3 and 2Vdd/3; and the gate terminals of the upper NFET and PFET operate in a voltage domain between 2Vdd/3 and Vdd. Additional information regarding switched capacitor voltage converters of this type may be found in co-pending U.S. application Ser. No. 12/392,476, assigned to the assignee of the present application, and the contents of which are incorporated herein by reference in their entirety.

Referring now to FIGS. 3(a) and 3(b), there are shown schematic diagrams of 2-to-1 and 3-to-1 switched capacitor voltage converters 312a and 312b, respectively, that may be used within the IC system of FIG. 1 in accordance with an exemplary embodiment. In contrast to the converters shown in FIGS. 2(a) and 2(b), the 2-to-1 converter 312a and 3-to-1 converter 312b utilize NFET and PFET gate clock signals that swing within the full 0 to Vdd operating range. That is, no level-shifting is needed for the converter clock signal. In this manner, a low switching resistance is achieved by using the full Vdd swing. Otherwise, it is difficult to efficiently obtain a low switching resistance when the generated output voltage is low (e.g., on the order of about 0.25 V). As will also be noted for the 3-to-1 switched capacitor voltage converter 312b of FIG. 3(b), the circuit topology is such that the three PFET are serially connected above the three serially connected NFETs. By swapping a lower PFET with an upper NFET, more gate overdrive is enabled.

Figure 4:
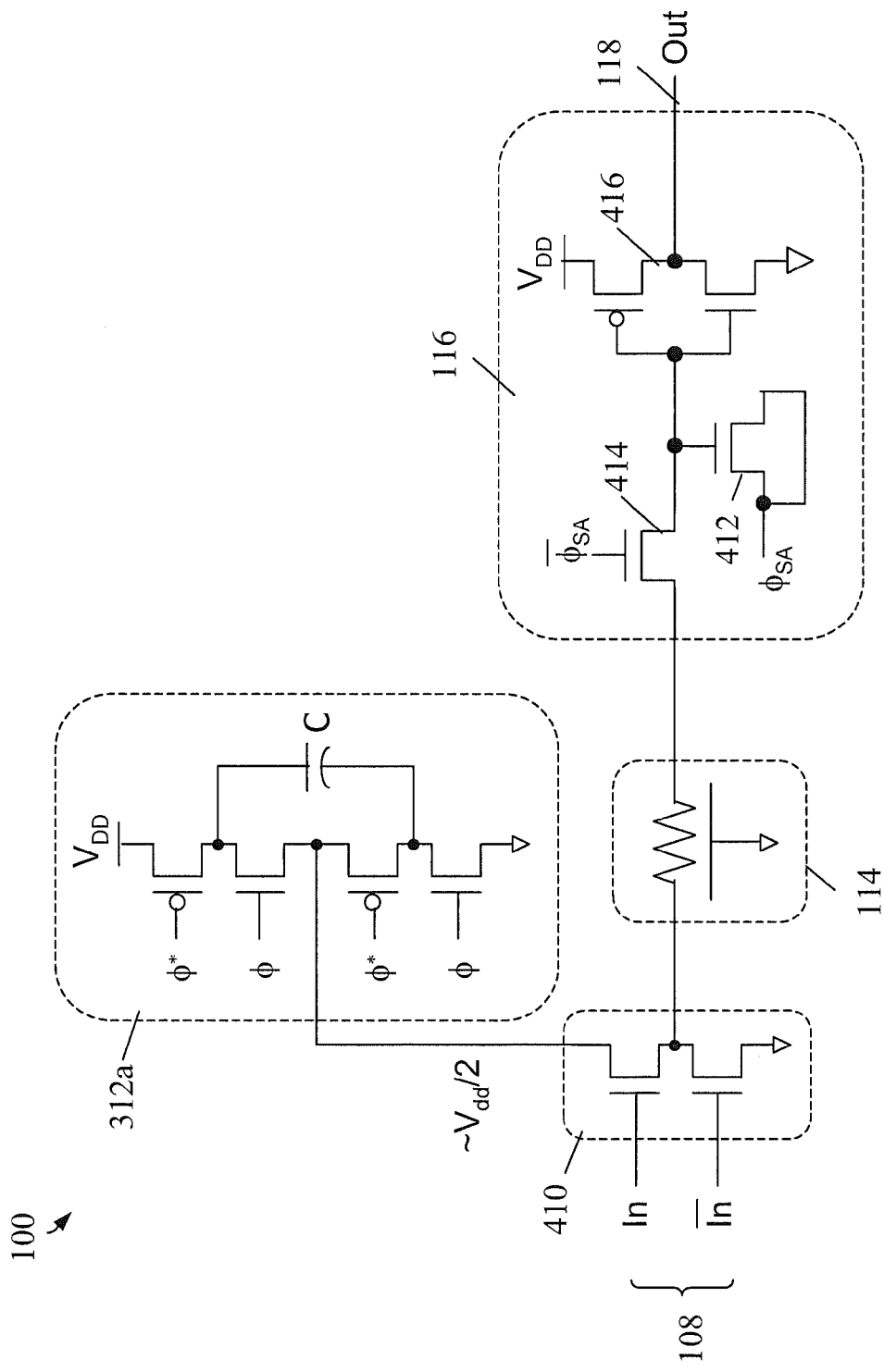
FIG. 4 is a schematic diagram illustrating a more detailed implementation of the IC system of FIG. 1, in accordance with a further exemplary embodiment.

FIG. 4 is a schematic diagram illustrating a more detailed implementation of the IC system 100 of FIG. 1, in accordance with a further exemplary embodiment. As is shown, a level-shifting driver 410 is implemented through a pair of stacked NFET devices, and having a complementary input signal pair 108 respectively coupled to the gates thereof. The input swing of the input signal pair 108, being in the first voltage domain discussed above, is the full 0 to Vdd operating range. The bottom NFET of the driver 410, coupled to the complement of the input signal In, pulls signal in the low voltage I/O domain represented by the interconnect I/O load 114 to ground when the value of In is 0V. Conversely, when In is at the Vdd value, the upper NFET of the driver 410, coupled to the input signal In, pulls the voltage of I/O load 114 to the reduced value as dictated by the on-chip voltage converter.

In the embodiment illustrated, the system 100 is shown with a 2-to-1 converter, such as converter 312a in FIG. 3(a). It should be appreciated that a 3-to-1 converter, such as converter 312a in FIG. 3(b), could also be used. Thus, the voltage on the I/O load 114 may swing from 0 to about Vdd/2 or from 0 to about Vdd/3, depending on the converter used. The clock for converter 312a may be related to the I/O rate of the input signals 108.

It should be noted at this point that the on-chip supply voltage generation unit 112 generally depicted in FIG. 1 and exemplified by converter 312a of FIG. 4 may be implemented on either a global level or a local level. For example, in a global case, converter 312a may represent a single, on-chip converter circuit generating a shared lower Vdd voltage (of about 0.25 V, for example) that all of the level-shifting drivers 410 tap into. On the other hand, in a local case, multiple converter circuits 312a may be dedicated to smaller groups of level-shifting drivers and, in the most extreme case, each level-shifting driver 410 can have its own dedicated voltage converter. The local distribution of voltage converter circuits, although consuming more device real estate and more complex in nature would offer the benefit of decrease power dissipation. That is, the reduced voltage is generated only where and when needed. In other words, the clock may be pulsed so as to active only those voltage converter circuits that are tied to drivers actually sending data. Otherwise, the converters associated with inactive level-shifting drivers remain inactive, thereby saving power.

As further illustrated in FIG. 4, the sense amplifier 116 for up-converting the low voltage signal carried over the I/O load 114 is embodied by gated diode sense amplifier that includes a two terminal FET device 412 configured as a gated diode, a FET isolation device 414, and an output stage 416 (e.g., a buffer or latch). The gate and source of an FET (with or without a drain connected in parallel) forms a gated diode, where charge is stored in the inversion layer when the gate-to-source voltage ($V_{gs}$) is above the threshold voltage ($V_t$), and substantially less otherwise. The amplifier 116 makes use of the nonlinear capacitance of the gated diode 412 for voltage boosting. When a small signal (e.g., Vdd/2 or Vdd/3) corresponding to 1-data appears at the gate of the gated diode 412, charge is stored. The signal is then boosted to a high level that can be used to drive subsequent logic. For 0-data, there is little voltage boosting and the signal remains very small. A control signal $\phi_{SA}$, which is normally ground during the sampling phase and is raised to positive during the (signal) sensing phase, is applied to the source of the gated diode to operate the gated diode. The isolation device 414 is adapted to be turned on when $V_{gd}$ is below a predetermined value and to be turned off "unidirectionally" when $V_{gd}$ rises above this predetermined value during signal amplification of the sensing phase. These operating characteristics may be accomplished by placing a substantially constant voltage or a pulse complementary to $\phi_{SA}$ ($\phi_{SA}$ bar) on the gate terminal of the isolation device 414 that is greater than a threshold voltage thereof by about the magnitude of the low voltage signal at logic 1.

Thus, the gated diode sense amplifier 116 may detect and amplify a small signal with an amplitude as small as about 10%-20% of the supply voltage, while outputting a signal 118 at a full voltage level swing. Additional information regarding gated diode amplifiers of this type may be found in co-pending U.S. Patent Application Publication 2009/0103382, assigned to the assignee of the present application, and the contents of which are incorporated herein by reference in their entirety.

Figure 5B:
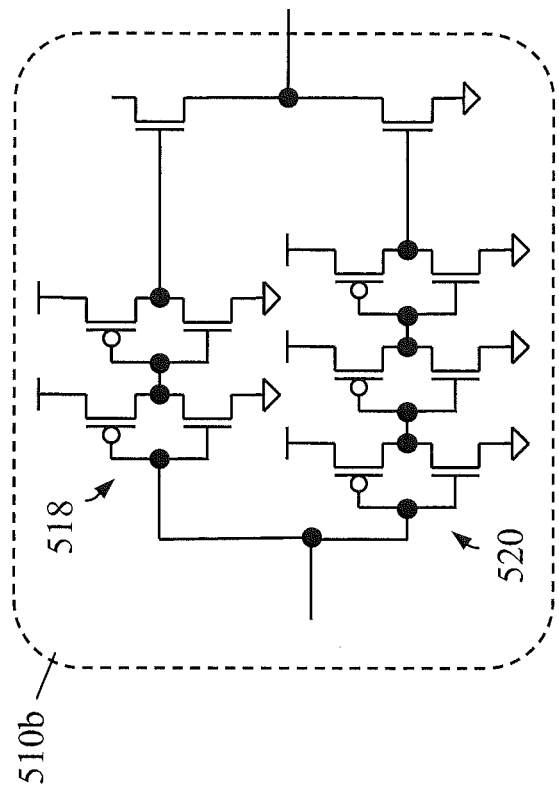
FIGS. 5(a) and 5(b) are schematic diagrams of exemplary level-shifting drivers that may be used in conjunction with the IC of FIG. 4, in accordance with a further exemplary embodiment.
Figure 5A:
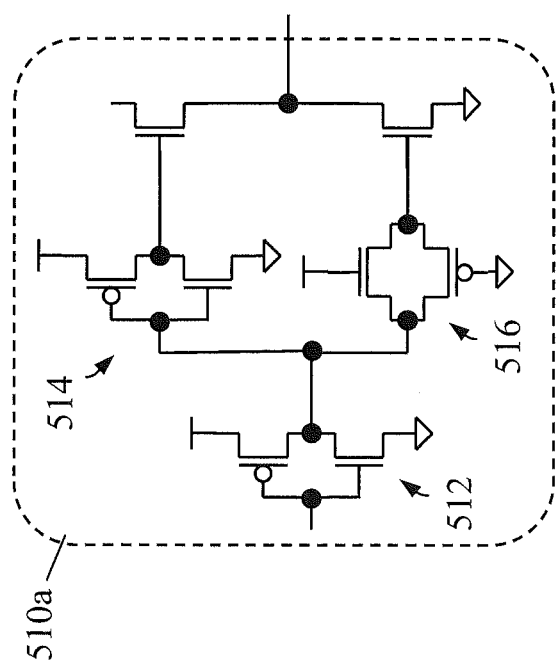

In order to minimize the short circuit (direct) current of the level-shifting driver 410, additional circuitry may be incorporated therein to implement a more proper timing match between the upper and lower NFETs. FIGS. 5(a) and 5(b) are schematic diagrams of exemplary level-shifting drivers that may be used in conjunction with the IC of FIG. 4, in accordance with a further exemplary embodiment. For the level-shifting driver 510a of FIG. 5(a), the input signal is coupled to a first inverter 512, the output of which is coupled to a second inverter 514 connected to the upper NFET of the driver. The output of the first inverter 512 is also coupled to a parallel NFET/PFET pass gate pair 516, the output of which is connected to the lower NFET of the driver. Thus, the gate of the upper NFET of the driver receives the true state of the input signal and the lower NFET of the driver receives the complementary state of the input signal, but with a better timing match.

Alternatively, in the level-shifting driver 510a of FIG. 5(a), the input signal is coupled to an even numbered inverter stage 518 connected to the upper NFET of the driver, as well as an odd numbered inverter state 520 connected to the lower NFET of the driver. Again, the gate of the upper NFET of the driver receives the true state of the input signal while the lower NFET of the driver receives the complementary state of the input signal. Here, the timing match is achieved through appropriate device sizing.

Figure 6:
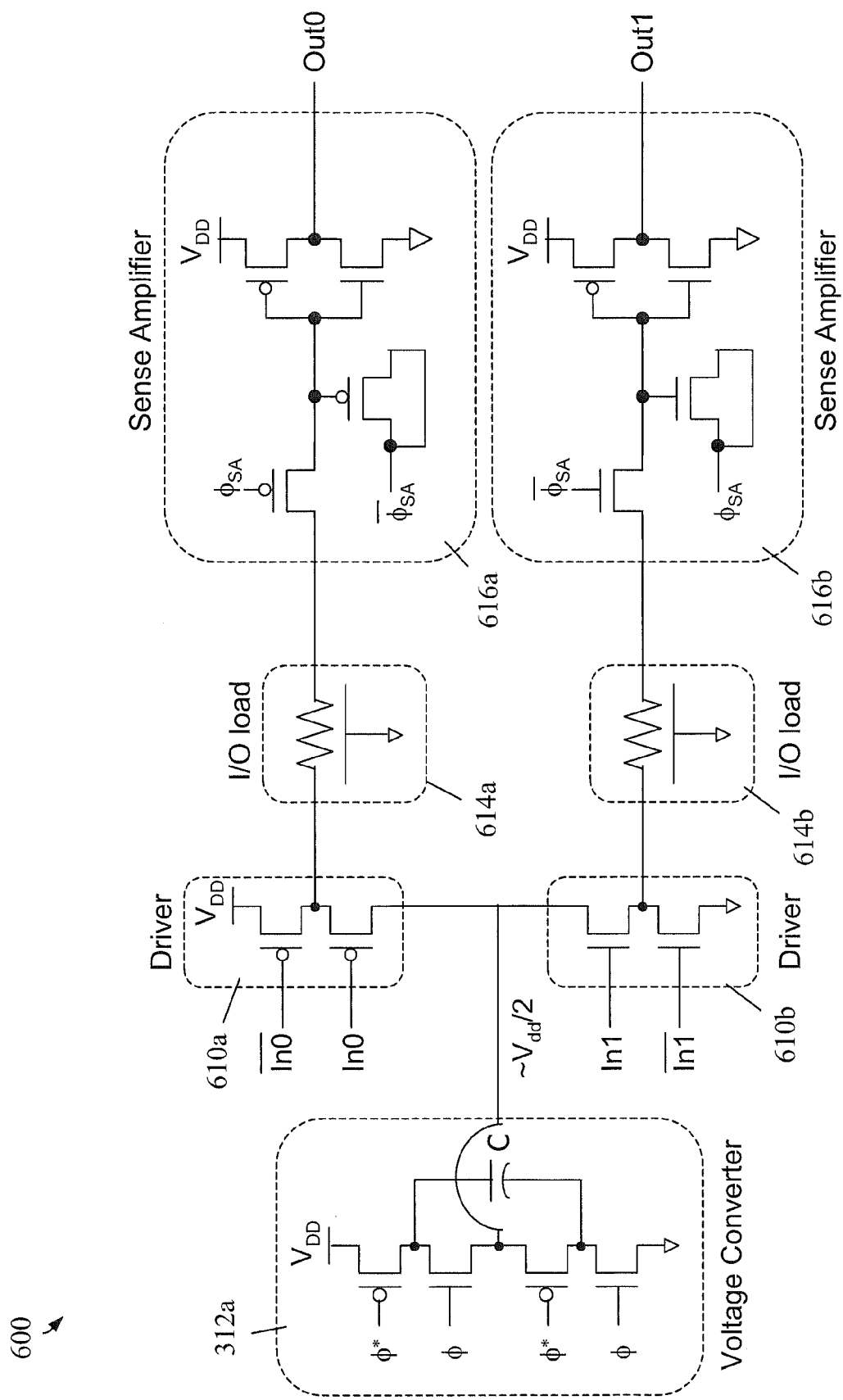
FIG. 6 is a schematic diagram illustrating a stacked voltage domain implementation of the IC system of FIG. 1, in accordance with still a further exemplary embodiment.

In the embodiments described to this point, signal transmission in the low voltage domain takes place in the lower fraction of the entire Vdd voltage range (e.g., between ground and Vdd/2 or between ground and Vdd/3). However, it is also contemplated that the low voltage domain of transmitted bits may be stacked with respect to one another. In this regard, FIG. 6 is a schematic diagram illustrating a stacked voltage domain implementation 600 of the IC system of FIG. 1, in accordance with still a further exemplary embodiment. As is shown, a 2-to-1 voltage converter (e.g., converter 312a) is coupled to both an NFET stack level-shifting driver 610b, as discussed above, and a PFET stack level-shifting driver 610a. In this manner, the PFET level-shifting driver 610a receives a first data bit represented by the complementary signal pair In0 and In0 bar, while the NFET level-shifting driver 610b receives a second data bit represented by the complementary signal pair In1 and In1 bar. Thus configured, transmission of the first data bit over the I/O load 614a in the low voltage domain will (in this example) swing between a logic high value of Vdd and a logic low value of Vdd/2. In contrast, transmission of the second data bit over the I/O load 614b in the low voltage domain will swing between a logic high value of Vdd/2 and a logic low value of ground (0V). Each I/O load 614a, 614b is shown coupled to associated gated diode sense amplifiers 616a, 616b, respectively, for up-conversion back to the full 0 to Vdd swing.

Although the above described voltage stacking implementation could be applied to 3-to-1 conversion, such an embodiment would entail more complex control circuitry.

Figure 7:
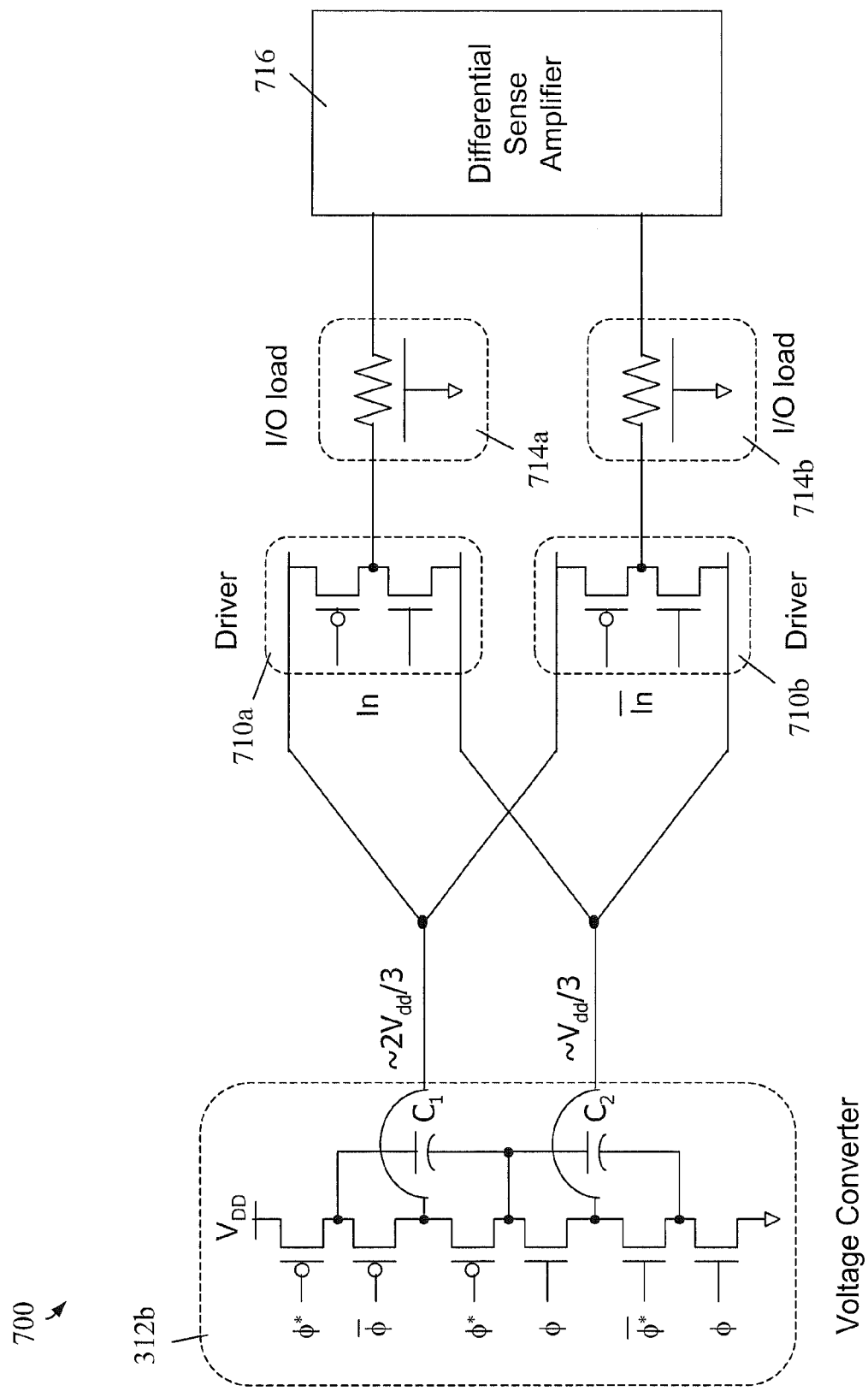
FIG. 7 is a schematic diagram illustrating a differential signaling implementation of the IC system of FIG. 1, in accordance with still a further exemplary embodiment.

Finally, FIG. 7 is a schematic diagram illustrating a differential signaling implementation 700 of the IC system of FIG. 1, in accordance with still a further exemplary embodiment. Such an embodiment may be useful, for example, in noisy signal environments where benefits in common-mode noise rejection are especially important. As shown in FIG. 7, the system 700 includes a 3-to-1 converter (e.g., converter 312b) and a pair of PFET/NFET level-shifting drivers 710a, 710b. The PFET source terminal of each driver is coupled to (about) a 2Vdd/3 output of the converter 312b, while the NFET source terminal of each drive is coupled to (about) a Vdd/3 output of the converter 312b. Thus, for a differential input signal In, In bar that (in one exemplary embodiment) swings between Vdd and ground, the outputs of the level-shifting drivers 710a, 710b will shift between 2Vdd/3 and Vdd/3. However, the input signals to the level-shifting drivers 710a, 710b may also be customized for power savings. For example, input signals to the PFET devices in the level-shifting drivers 710a, 710b could swing between ground and 2Vdd/3, while input signals to the NFET devices could swing between Vdd and Vdd/3.

The I/O load pair 714a, 714b is coupled to a conventional differential sense amplifier 716, as known in the art. The differential sense amplifier 716 then senses a slight voltage differential between the I/O load pair 714a, 714b and clamps the output to the full 0 to Vdd swing.

As will thus be appreciated, the exemplary low voltage signaling embodiments for IC systems lead to significantly reduced power consumption by leveraging efficient switched capacitor circuits for on-chip low voltage generation, in combination with full Vdd swing inputs for FET level-shifting drivers. On the receiving end, sense amplifiers such as fast, low power gated diode sense amplifiers recover the data to the full Vdd swing.

While the invention has been described with reference to a preferred embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A low voltage signaling system for integrated circuits, comprising:
    a first voltage domain operating at a nominal integrated circuit (IC) power supply voltage (Vdd) swing level at a signal transmitting end of a first chip, a second voltage domain having one or more transmission interconnect lines operating at a reduced voltage swing level with respect to the first voltage domain, and a third voltage domain at a signal receiving end of a second chip, the third voltage domain operating at the Vdd swing level;
    wherein an input signal originating from the first voltage domain is down converted to operate at the reduced voltage swing level for transmission over the second voltage domain, and wherein the third voltage domain senses the input signal transmitted over the second voltage domain and generates an output signal operating back up at the Vdd swing level; and
    a switched capacitor on-chip supply voltage generation unit configured to generate one or more reduced voltage levels with respect to Vdd.

2. The system of claim 1, further comprising:
    a level-shifting driver in communication with the on-chip voltage supply generation unit and the input signal, the level-shifting driver outputting the converted input signal operating at the reduced voltage swing level.

3. The system of claim 2, wherein the switched capacitor converter comprises a 2-to-1 converter having Vdd as an input voltage thereto and produces an output voltage of about Vdd/2.

4. The system of claim 2, wherein the switched capacitor converter comprises a 3-to-1 converter having Vdd as an input voltage thereto and producing at least one output voltage of about Vdd/3.

5. The system of claim 4, wherein the switched capacitor converter produces another output voltage of about 2Vdd/3.

6. The system of claim 2, wherein input signals to field effect transistor (FET) switches of the switched capacitor converter operate at the Vdd swing level.

7. The system of claim 2, wherein the level-shifting driver comprises a field effect transistor (FET) stack, a first FET of which drives the input signal to a logic low voltage within the second voltage domain, and a second of which drives the input signal to a logic high voltage within the second voltage domain.

8. A low voltage signaling system for integrated circuits, comprising:
    a first voltage domain operating at a nominal integrated circuit (IC) power supply voltage (Vdd) swing level at a signal transmitting end of a first chip, a second voltage domain having one or more transmission interconnect lines operating at a reduced voltage swing level with respect to the first voltage domain, and a third voltage domain at a signal receiving end of a second chip, the third voltage domain operating at the Vdd swing level;
    wherein an input signal originating from the first voltage domain is down converted to operate at the reduced voltage swing level for transmission over the second voltage domain, and wherein the third voltage domain senses the input signal transmitted over the second voltage domain and generates an output signal operating back up at the Vdd swing level;
    an on-chip supply voltage generation unit for generating one or more reduced voltage levels with respect to Vdd;
    a level-shifting driver in communication with the on-chip voltage supply generation unit and the input signal, the level-shifting driver outputting the converted input signal operating at the reduced voltage swing level; and
    a gated diode sense amplifier in the third voltage domain that senses the input signal transmitted over the second voltage domain and generates the output signal operating back up at the Vdd swing level.

9. A method of implementing a low voltage signaling system for integrated circuits, comprising:
    operating a first voltage domain at a nominal integrated circuit (IC) power supply voltage (Vdd) swing level at a signal transmitting end of a first chip, operating a second voltage domain having one or more transmission interconnect lines at a reduced voltage swing level with respect to the first voltage domain, and operating a third voltage domain at a signal receiving end of a second chip, the third voltage domain operating at the Vdd swing level;
    down converting an input signal originating from the first voltage domain to operate at the reduced voltage swing level for transmission over the second voltage domain, and wherein the third voltage domain senses the input signal transmitted over the second voltage domain and generates an output signal operating back up at the Vdd swing level; and
    utilizing a switch capacitor on-chip supply voltage generation unit to generate one or more reduced voltage levels with respect to Vdd.

10. The method of claim 9, further comprising:
    utilizing a level-shifting driver in communication with the on-chip voltage supply generation unit and the input signal, the level-shifting driver outputting the converted input signal operating at the reduced voltage swing level.

11. The method of claim 10, wherein the switched capacitor converter comprises a 2-to-1 converter having Vdd as an input voltage thereto and produces an output voltage of about Vdd/2.

12. The method of claim 10, wherein the switched capacitor converter comprises a 3-to-1 converter having Vdd as an input voltage thereto and producing at least one output voltage of about Vdd/3.

13. The method of claim 12, wherein the switched capacitor converter produces another output voltage of about 2Vdd/3.

14. The method of claim 10, wherein input signals to field effect transistor (FET) switches of the switched capacitor converter operate at the Vdd swing level.

15. The method of claim 10, wherein the level-shifting driver comprises a field effect transistor (FET) stack, a first FET of which drives the input signal to a logic low voltage within the second voltage domain, and a second of which drives the input signal to a logic high voltage within the second voltage domain.

16. A method of implementing a low voltage signaling system for integrated circuits, comprising:

operating a first voltage domain at a nominal integrated circuit (IC) power supply voltage (Vdd) swing level at a signal transmitting end of a first chip, operating a second voltage domain having one or more transmission interconnect lines at a reduced voltage swing level with respect to the first voltage domain, and operating a third voltage domain at a signal receiving end of a second chip, the third voltage domain operating at the Vdd swing level;

down converting an input signal originating from the first voltage domain to operate at the reduced voltage swing level for transmission over the second voltage domain, and wherein the third voltage domain senses the input signal transmitted over the second voltage domain and generates an output signal operating back up at the Vdd swing level;

utilizing an on-chip supply voltage generation unit for generating one or more reduced voltage levels with respect to Vdd; and utilizing a level-shifting driver in communication with the on-chip voltage supply generation unit and the input signal, the level-shifting driver outputting the converted input signal operating at the reduced voltage swing level; and utilizing a gated diode sense amplifier in the third voltage domain that senses the input signal transmitted over the second voltage domain and generates the output signal operating back up at the Vdd swing level.

17. A low voltage signaling system for integrated circuits, comprising:

a first voltage domain operating at a nominal integrated circuit (IC) power supply voltage (Vdd) swing level at a signal transmitting end of a first chip, the first voltage domain including a switched capacitor converter on-chip supply voltage generation unit for generating one or more reduced voltage levels with respect to Vdd, and a level-shifting driver in communication with the on-chip voltage supply generation unit and a first input signal, the level-shifting driver outputting a converted first input signal to a reduced voltage swing level with respect to the first voltage domain;

a second voltage domain having one or more transmission interconnect lines operating at the reduced voltage swing level; and a sense amplifier in a third voltage domain at a signal receiving end of a second chip, the third voltage domain operating at the Vdd swing level, wherein the sense amplifier senses the down converted first input signal transmitted over the second voltage domain and generates a first output signal operating back up at the Vdd swing level.

18. The system of claim 17, wherein input signals to field effect transistor (FET) switches of the switched capacitor converter operate at the Vdd swing level.

19. The system of claim 18, wherein the sense amplifier comprises a gated diode sense amplifier.

20. The system of claim 19, wherein:

the switched capacitor converter comprises a 2-to-1 converter having Vdd as an input voltage thereto and produces an output voltage of about Vdd/2;

the level-shifting driver comprises an NFET stack that receives the first input signal and down converts it to swing between a logic low value of about 0 volts and a logic high value of about Vdd/2; and the level-shifting driver further comprises a PFET stack that receives a second input signal and converts it to swing between a logic low value of about Vdd/2 and a logic high value of about Vdd, thereby facilitating stacking of down converted voltage domains in the second voltage domain.

21. The system of claim 18, wherein:

the switched capacitor converter comprises a 3-to-1 converter having Vdd as an input voltage thereto and produces an output voltages of about Vdd/3 and 2Vdd/3;

the level-shifting driver comprises a first NFET/PFET stack that receives the first input signal and down converts it to swing between a logic low value of about Vdd/3 and a logic high value of about 2Vdd/3; and the level-shifting driver further comprises a second NFET/PFET stack that receives a complement value of the first input signal and down converts it to swing between a logic low value of about Vdd/3 and a logic high value of about 2Vdd/3.

* * * * *